United States Patent [19]
Amico

[11] Patent Number: 5,497,218
[45] Date of Patent: Mar. 5, 1996

[54] THREE POINT THERMISTOR TEMPERATURE SET UP

[75] Inventor: Mark S. Amico, Rochester, N.Y.

[73] Assignee: Xerox Corporation, Stamford, Conn.

[21] Appl. No.: 295,375

[22] Filed: Aug. 24, 1994

[51] Int. Cl.$^6$ .......................... G03G 15/20; G03G 13/20
[52] U.S. Cl. ................................. 355/208; 355/285
[58] Field of Search ....................... 355/285, 289, 355/290, 208, 282

[56] References Cited

U.S. PATENT DOCUMENTS

| | | | |
|---|---|---|---|
| 3,832,524 | 8/1974 | Takiguchi | 219/216 |
| 4,075,455 | 2/1978 | Kitamura et al. | 219/216 |
| 4,434,353 | 2/1984 | Marsh et al. | 219/216 |
| 4,474,456 | 10/1984 | Kobayashi et al. | 355/285 |
| 4,531,824 | 7/1985 | Landa | 355/285 |
| 4,585,325 | 4/1986 | Euler | 355/290 |
| 4,825,242 | 4/1989 | Elter | 355/208 |
| 4,928,147 | 5/1990 | Baumann et al. | 355/288 |
| 5,041,718 | 8/1991 | d'Hondt et al. | 219/255 |
| 5,206,694 | 4/1993 | Ohira et al. | 355/290 |
| 5,227,270 | 7/1993 | Scheuer et al. | 430/31 |

Primary Examiner—Nestor R. Ramirez

[57] ABSTRACT

Thermistors are calibrated by taking three thermistor resistance measurements at various temperatures. The resistance values are converted or transferred to Analog to Digital (A/D) bits or bit values which the machine's microprocessor can relate to temperature. The three values are utilized for constructing a calibration curve in the microprocessor for a specific thermistor bead. Use of the curve allows for mathematical interpolation by the microprocessor between calibration points, providing a wider and more accurate range to set the fuser roll temperatures. This increased accuracy over a wider range than before allows the sensor to become a common part for a family of products which may require different standby and runtime temperatures.

18 Claims, 5 Drawing Sheets

THREE POINT THERMISTOR TEMPERATURE SET UP

BACKGROUND OF THE INVENTION

This invention relates generally to a heat and pressure fuser for an electrophotographic printing machine, and more particularly the invention is directed to a temperature controller for a fuser arrangement for controlling the surface temperature of a fuser roll.

In a typical electrophotographic printing process, a photoconductive member is charged to a substantially uniform potential so as to sensitize the surface thereof. The charged portion of the photoconductive member is exposed to selectively dissipate the charges thereon in the irradiated areas. This records an electrostatic latent image on the photoconductive member. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In order to fix or fuse the toner material onto a support member permanently by heat, it is necessary to elevate the temperature of the toner material to a point at which constituents of the toner material coalesce and become tacky. This action causes the toner to flow to some extent onto the fibers or pores of the support members or otherwise upon the surfaces thereof. Thereafter, as the toner material cools, solidification of the toner material occurs causing the toner material to be bonded firmly to the support member.

One approach to thermal fusing of toner material images onto the supporting substrate has been to pass the substrate with the unfused toner images thereon between a pair of opposed roller members at least one of which is internally heated. During operation of a fusing system of this type, the support member to which the toner images are electrostatically adhered is moved through the nip formed between the rolls with the toner image contacting the heated fuser roll to thereby effect heating of the toner images within the nip.

Thermistors are typically used to sense the temperature of a fuser roll in xerographic machines. Achieving the temperature accuracy necessary for today's permanence and fix requirements, demands a thermistor with a repeatable resistance at a given temperature. The repeatability of a thermistor at a given temperature is 100%. The problem with today's designs is the repeatability from part to part. Until now, the most cost effective thermistors have had a part to part resistance resistance variability of ±20% at a given setpoint temperature. This large tolerance requires a temperature setup which takes time and effort, both as a part of manufacture and in the field.

A method for setting a fuser temperature in prior art machines such as the 1075 and 4050 consists of using a heat sensitive tape accurate to ±5° C. The heat sensitive tape used in setting up prior art machines changes color as it is heated. The process involves stabilizing heating of the fuser roll to its standby temperature which takes about twenty to thirty minutes. If the temperature indicated by the change in color of the tape coincides with the desired setpoint temperature the process need go no further. However, since the degree of accuracy of manufacture of thermistors varies quite a bit, the foregoing is almost always never the case. Thus, the foregoing process has to be repeated.

A machine such as the 1065 utilizes an On/Off controller and the same temperature for both run and standby operation. A single bit value for the thermistor is used by that machines microprocessor.

The fuser temperature controller of machines like the 4890 requires greater precision (<±2 deg C.) than existing temperature control algorithms. Thus, heretofore standard methods are rendered obsolete.

Following is a discussion of (additional) prior art, incorporated herein by reference, which may bear on the patentability of the present invention. In addition to possibly having some relevance to the question of patentability, these references, together with the detailed description to follow, may provide a better understanding and appreciation of the present invention.

U.S. Pat. No. 4,434,353 granted to Marsh et al. on Feb. 28, 1984 discloses an apparatus which includes a plurality of heating elements to fuse a powder energized in an ordered sequence corresponding to the surface area of the powder image being fused.

U.S. Pat. No. 5,227,270 granted on Jul. 13, 1993 to Scheuer et al. discloses a single pass tri-level imaging apparatus wherein a pair of Electrostatic Voltmeters (ESV) are utilized to monitor various control patch voltages to allow for feedback control of Infra-Red Densitometer (IRD) readings.

U.S. Pat. No. 3,832,524 granted to Takiguchi on Aug. 27, 1974 discloses a copying machine having a heating unit including a central heating element and two end heating elements. A switch connects the central and two end heating elements in parallel across a voltage source when the larger of two different width copy sheets is used. The switch disconnects the two end heating elements from the voltage source when the smaller of two different width copy sheets is used.

U.S. Pat. No. 4,075,455 granted to Kitamura et al. on Feb. 21, 1978 discloses a fusing device having a plate and a heater disposed transversely of the plate. The heater is divided into heater sections in the direction of the width of the copy sheet. A temperature sensor controls the power to each of the heater sections. The power furnished to the heating elements depends upon the width of the copy sheet.

U.S. Pat. No. 4,928,147 granted to Baumann et al. on May 22, 1990 discloses a device wherein image defining toner is transferred to cut sheets and fused at one of two fuser stations. One station is positioned to fuse the image on one side when duplex copying or printing is selected. The other fuser station performs fusing when simplex copying is selected but fuses the second side copy for duplexing. When flash lamps are employed for the fuser station, the lamps are composed of multiple bays with a single power source coupled to each bay in sequence so that the power source size need only accommodate the power level demand of one bay. The time between trigger pulses is extended by commencing fusing with an intermediate bay followed by the initial bay and then the final bay as the image area requiring fusing passes along its path in proximity to the faces of the flash lamp bays.

U.S. Pat. No. 4,531,824 granted to Benzion Landa on Jul. 30, 1985 discloses an improved heater for electrophotographic copiers wherein a plurality of laterally spaced heaters dry or fix the transferred image along narrow longitudinally extending strips to prevent smearing of the image from subsequent contact with feed wheels or guides.

U.S. Pat. No. 4,474,456 granted to Kobayashi et al. on Oct. 2, 1984 disclosed a heat-fixing device including a heat plate along which a transfer medium bearing thereon a toner image is advanced during which the toner image becomes fixed to the transfer medium by fusing, the heat plate including a plurality of heating sections arranged along the direction of advancement of said transfer medium each of the heating sections being provided with at least one electrical heater. The device also includes a control circuit for controlling the operation of the heaters such that, under a non-steady condition, only selected ones of the heaters are set in operation thereby only the corresponding heating sections are positively heated; whereas, under a steady-state condition, all of the heaters are operated at the same time thereby maintaining all of the heating sections at a predetermined temperature.

U.S. Pat. No. 4,825,242 granted to Michael R. Elter on Apr. 25, 1989 discloses an apparatus in which an image is fused to a sheet during a copy run. The number of sheets having images fused thereto is counted during the copy run. Heat is applied to at least the images of successive sheets of the copy run. The heat being applied to the images on successive sheets is controlled in response to the number of sheets counted. Two fuser lamps are energized in accordance with the size of substrate being fused.

U.S. Pat. No. 5,206,694 granted to Ohira et al. on Apr. 27, 1993 discloses an image forming apparatus comprises an image forming portion for forming toner images on a sheet of paper, a fixing portion for fixing the toner images on the sheet of paper by heat, and a counter for counting the number of sheets on which images are fixed from the time of turning on of the power. The image forming portion forms toner images on the paper at a low speed until the counter counts a prescribed number. Since the number of sheets to be fixed is reduced at the start of operation, the temperature of the fixing portion is not very much lowered. Namely, the fixing operation can be started when the temperature of the fixing portion reaches a prescribed value. Therefore, the time required for warming up the image forming forming apparatus can be reduced.

U.S. Pat. No. 4,585,325 granted to Euler on Apr. 29, 1985 describes a heated fixing roller having two heating elements located inside the roller. The heating elements are connected to a control system and a sensor to control the current being supplied to the heating elements. There is disposed within the heating roller a second electrical heating element, which is connected to the control system through an additional temperature sensor. This second element runs parallel to the roller axis. The first heating element has a middle coil in the middle zone of the heating roller and the second or other heating element has two end coils disposed near the edge zones of the heating roller adjacent the left and right of the middle zone. The middle coil in the middle zone overlaps with each end coil in each edge zone, and the current supply to the heating elements is controlled so that on the surface of the heating roller there results a surface temperature distribution in the axial direction which exhibits a local minimum or maximum in the middle zone and maxima near the two end faces of the roller, one of the two temperature sensors is located near the extremum of the surface temperature in the middle of the roller, and the other temperature sensor is located near the middle of one of the edge zones of the heating roller.

U.S. Pat. No. 5,041,718 granted to k'Hondt et al. on Aug. 20, 1991 discloses a device for fixing a powder image on a receiving support using heat that consists of an image transfer roller internally provided with a first heating element having the same heat-generating power over the entire length of the image transfer roller, and a second heating element which has a higher heat-generating power in the edge zones of the image transfer roller than in the middle zone of the roller, and a pressure roller internally provided with a third heating element which like the second heating element has a higher heat-generating power in the edge zones than in the middle zone. The device may be in a warm-up condition in which the temperature of the rollers is not yet at the working level, stand-by condition in which the temperature is at the working level but in which no fixing is carried out, and a fixing condition in which fixing is carried out. During warm-up, all the heating elements generate the maximum power. During stand-by, the first heating element is switched off and the effective powers of the second and third heating elements are set to a much lower value, so that the ratio between the amount of heat generated in the edge zones and the amount of heat generated in the middle zone is greater than during warm-up. During fixing, the effective powers of all three heating elements are set to a higher value than during stand-by, but the ratio between the amount of heat generated in the edge zones and the amount of heat generated in the middle zone is lower than during stand-by.

An imaging device or the type disclosed in the '270 patent requires the fuser to fix two different toners (black and color) simultaneously. Graininess in black solid areas resulting from interactions of the black latent image with the color developer brush is minimized by running with a high transferred mass The high mass requires higher surface temperature to meet the desired fix performance which reduces the difference between nominal temperature and the onset of hot offset. Finally, the increased rubber coating thickness (needed to meet fuser roll life targets) increases the lag time of the system which, in turn, increases the steady state temperature fluctuations resulting from the simple on-off controller. Since the existing fusers are not well suited for fusing the types of images contemplated there is need for an improved fuser for such purpose.

BRIEF SUMMARY OF THE INVENTION

In accordance the present invention, three thermistor resistance measurements are made at various temperatures. The resistance values are converted or transferred to Analog to Digital (A/D) bits or bit values which the machine's microprocessor can relate to temperature. The three values are utilized for constructing a calibration curve for a specific thermistor bead. Use of the curve allows for mathematical interpolation and extrapolation by the microprocessor between points, providing a wider and more accurate range for setting fuser roll temperatures. This increased accuracy over a wider width than before allows the sensor to become a common part for a family of products which may incorporate different standby and runtime temperature requirements for the different products.

Other features of the present invention will become apparent as the following description proceeds and upon reference to the drawings, in which:

While the present invention will be described in connection with a tri-level printing, it will be understood that it is not intended to limit the invention to that type of printing. On the contrary, it is intended to cover all alternatives, modifications, and equivalents as may be included within the spirit and scope of the invention as defined by the appended claims.

DETAILED DESCRIPTION OF THE PREFERRED EMBODIMENT OF THE INVENTION

Figure 1A:
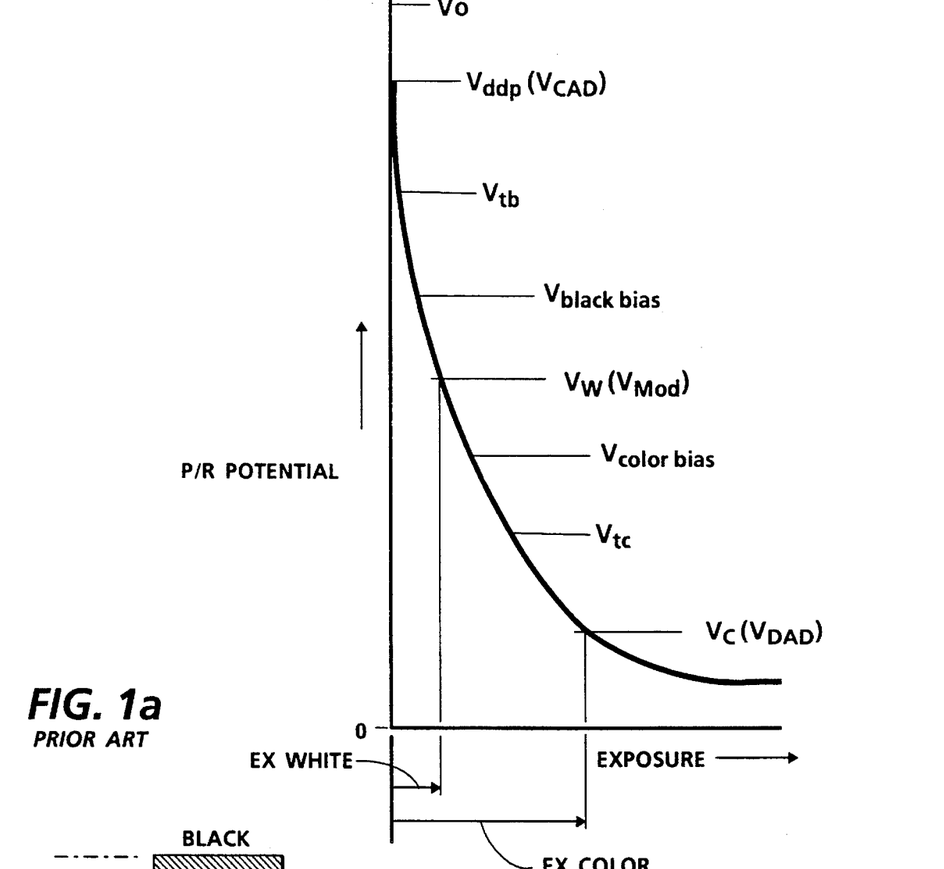
FIG. 1a is a plot of photoreceptor potential versus exposure illustrating a tri-level electrostatic latent image.
Figure 1B:
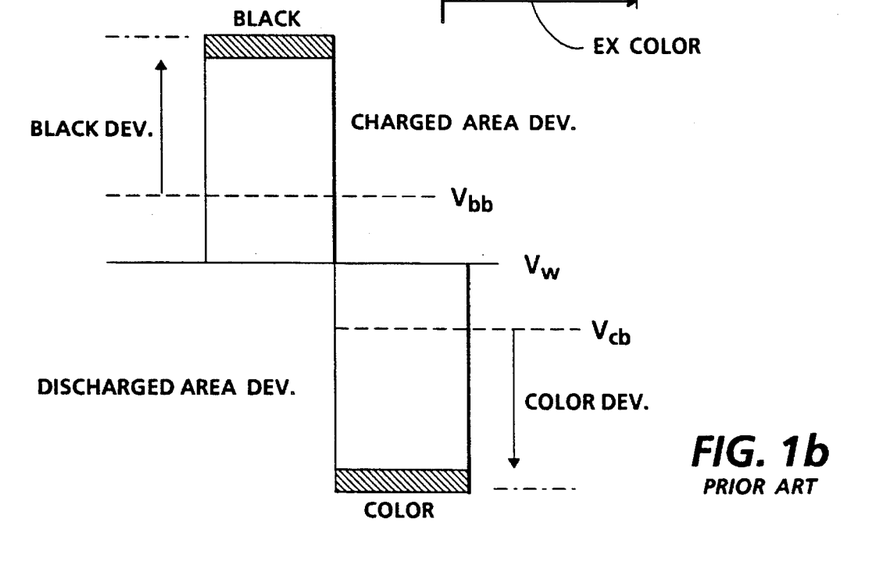
FIG. 1b is a plot of photoreceptor potential illustrating single-pass, highlight color latent image characteristics.

For a better understanding of the concept of tri-level, highlight color imaging, a description thereof will now be made with reference to FIGS. 1a and 1b. FIG. 1a shows a PhotoInduced Discharge Curve (PIDC) for a tri-level electrostatic latent image according to the present invention. Here $V_0$ is the initial charge level, $V_{ddp}$ ($V_{CAD}$) the dark discharge potential (unexposed), $V_w$ ($V_{Mod}$) the white or background discharge level and $V_c$ ($V_{DAD}$) the photoreceptor residual potential (full exposure using a three level Raster Output Scanner, ROS). Nominal voltage values for $V_{CAD}$, $V_{Mod}$ and $V_{DAD}$ are, for example, 788, 423 and 123, respectively.

Color discrimination in the development of the electrostatic latent image is achieved when passing the photoreceptor through two developer housings in tandem or in a single pass by electrically biasing the housings to voltages which are offset from the background voltage $V_{Mod}$, the direction of offset depending on the polarity or sign of toner in the housing. One housing (for the sake of illustration, the second) contains developer with black toner having triboelectric properties (positively charged) such that the toner is driven to the most highly charged ($V_{ddp}$) areas of the latent image by the electrostatic field between the photoreceptor and the development rolls biased at $V_{black\ bias}$ ($V_{bb}$) as shown in FIG. 1b. Conversely, the triboelectric charge (negative charge) on the colored toner in the first housing is chosen so that the toner is urged towards parts of the latent image at residual potential, $V_{DAD}$ by the electrostatic field existing between the photoreceptor and the development rolls in the first housing which are biased to $V_{color\ bias}$, ($V_{cb}$). Nominal voltage levels for $V_{bb}$ and $V_{cb}$ are 641 and 294, respectively.

Figure 2:
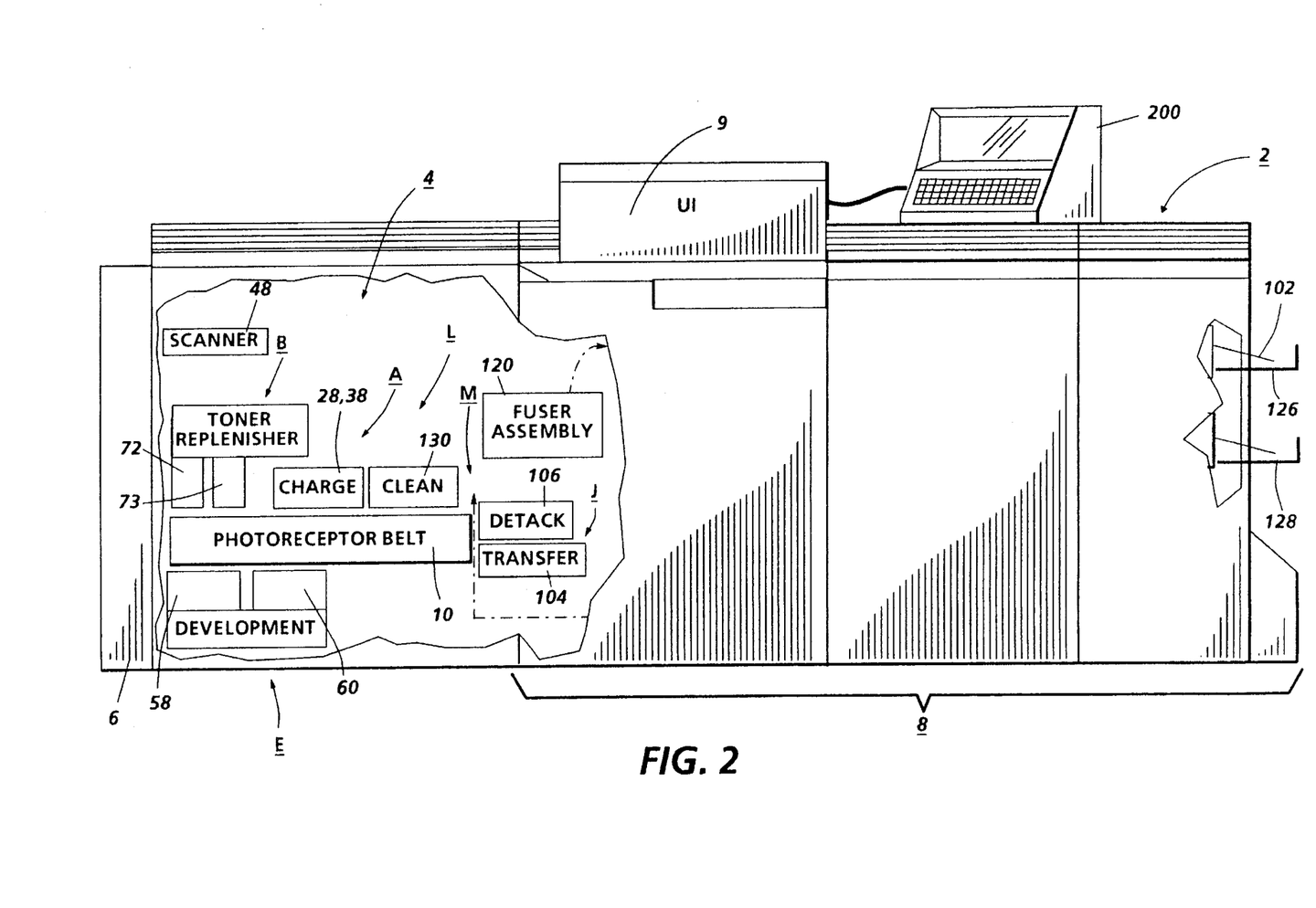
FIG. 2 is schematic illustration of a printing apparatus incorporating the inventive features of the invention.
Figure 3:
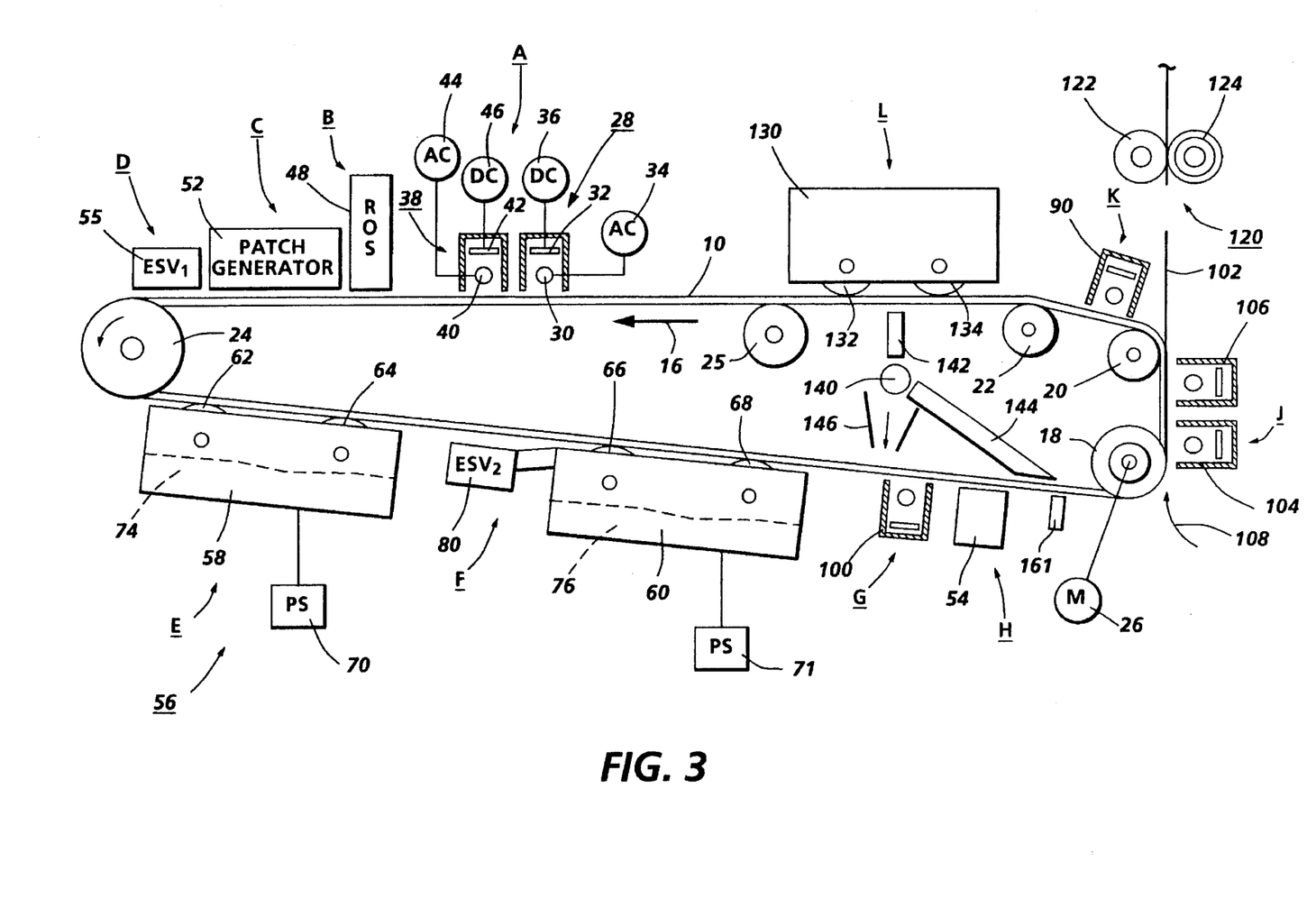
FIG. 3 a schematic of the xerographic process stations including the active members for image formation as well as the control members operatively associated therewith the printing apparatus illustrated in FIG. 2.

As shown in FIGS. 2 and 3, a highlight color printing apparatus 2 in which the invention may be utilized comprises a xerographic processor module 4, an electronics module or microprocessor 6, a paper handling module 8 and a user interface (UI) 9. A charge retentive member in the form of an Active Matrix (AMAT) photoreceptor belt 10 is mounted for movement in an endless path past a charging station A, an exposure station B, a test patch generator station C, a first Electrostatic Voltmeter (ESV) station D, a developer station E, a second ESV station F within the developer station E, a pretransfer station G, a toner patch reading station H where developed toner patches are sensed, a transfer station J, a preclean station K, cleaning station L and a fusing station M. Belt 10 moves in the direction of arrow 16 to advance successive portions thereof sequentially through the various processing stations disposed about the path of movement thereof. Belt 10 is entrained about a plurality of rollers 18, 20, 22, 24 and 25, the former of which can be used as a drive roller and the latter of which can be used to provide suitable tensioning of the photoreceptor belt 10. Motor 26 rotates roller 18 to advance belt 10 in the direction of arrow 16. Roller 18 is coupled to motor 26 by suitable means such as a belt drive, not shown. The photoreceptor belt may comprise a flexible belt photoreceptor. Typical belt photoreceptors are disclosed in U.S. Pat. Nos. 4,588,667, 4,654,284 and 4,780,385.

As can be seen by further reference to FIGS. 2 and 3, initially successive portions of belt 10 pass through charging station A. At charging station A, a primary corona discharge device in the form of dicorotron indicated generally by the reference numeral 28, charges the belt 10 to a selectively high uniform negative potential, $V_0$. As noted above, the initial charge decays to a dark decay discharge voltage, $V_{ddp}$, ($V_{CAD}$). The dicorotron is a corona discharge device including a corona discharge electrode 30 and a conductive shield 32 located adjacent the electrode. The electrode is coated with relatively thick dielectric material. An AC voltage is applied to the dielectrically coated electrode via power source 34 and a DC voltage is applied to the shield 32 via a DC power supply 36. The delivery of charge to the photoconductive surface is accomplished by means of a displacement current or capacitative coupling through the dielectric material. The flow of charge to the P/R 10 is regulated by means of the DC bias applied to the dicorotron shield. In other words, the P/R will be charged to the voltage applied to the shield 32. For further details of the dicorotron construction and operation, reference may be had to U.S. Pat. No. 4,086,650 granted to Davis et al on Apr. 25, 1978.

A feedback dicorotron 38 comprising a dielectrically coated electrode 40 and a conductive shield 42 operatively interacts with the dicorotron 28 to form an integrated charging device (ICD). An AC power supply 44 is operatively connected to the electrode 40 and a DC power supply 46 is operatively connected to the conductive shield 42.

Next, the charged portions of the photoreceptor surface are advanced through exposure station B. At exposure station B, the uniformly charged photoreceptor or charge retentive surface 10 is exposed to a laser based input and/or output scanning device 48 which causes the charge retentive surface to be discharged in accordance with the output from the scanning device. Preferably the scanning device is a three level laser Raster Output Scanner (ROS). Alternatively, the ROS could be replaced by a conventional xerographic exposure device. The ROS comprises optics, sensors, laser tube and resident control or pixel board.

The photoreceptor, which is initially charged to a voltage $V_0$, undergoes dark decay to a level $V_{ddp}$ or $V_{CAD}$ equal to about −900 volts to form CAD images. When exposed at the exposure station B it is discharged to $V_c$ or $V_{DAD}$ equal to about −100 volts to form a DAD image which is near zero or ground potential in the highlight color (i.e. color other than black) parts of the image. See FIG. 1a. The photoreceptor is also discharged to $V_w$ or $V_{mod}$ equal to approximately minus 500 volts in the background (white) areas.

A patch generator 52 (FIGS. 3 and 4) in the form of a conventional exposure device utilized for such purpose is positioned at the patch generation station C. It serves to create toner test patches in the interdocument zone which are used both in a developed and undeveloped condition for controlling various process functions. An Infra-Red densitometer (IRD) 54 is utilized to sense or measure the voltage level of test patches after they have been developed.

After patch generation, the P/R is moved through a first ESV station D where an ESV ($ESV_1$) 55 is positioned for sensing or reading certain electrostatic charge levels (i.e. $V_{DAD}$, $V_{CAD}$, $V_{Mod}$, and $V_{tc}$) on the P/R prior to movement of these areas of the P/R moving through the development station E.

At development station E, a magnetic brush development system, indicated generally by the reference numeral 56 advances developer materials into contact with the electrostatic latent images on the P/R. The development system 56 comprises first and second developer housing structures 58 and 60. Preferably, each magnetic brush development housing includes a pair of magnetic brush developer rollers. Thus, the housing 58 contains a pair of rollers 62, 64 while the housing 60 contains a pair of magnetic brush rollers 66, 68. Each pair of rollers advances its respective developer material into contact with the latent image. Appropriate developer biasing is accomplished via power supplies 70 and 71 electrically connected to respective developer housings 58 and 60. A pair of toner replenishment devices 72 and 73 (FIG. 2) are provided for replacing the toner as it is depleted from the developer housing structures 58 and 60.

Color discrimination in the development of the electrostatic latent image is achieved by passing the photoreceptor past the two developer housings 58 and 60 in a single pass with the magnetic brush rolls 62, 64, 66 and 68 electrically biased to voltages which are offset from the background voltage $V_{Mod}$, the direction of offset depending on the polarity of toner in the housing. One housing e.g. 58 (for the sake of illustration, the first) contains red conductive magnetic brush (CMB) developer 74 having triboelectric properties (i.e. negative charge) such that it is driven to the least highly charged areas at the potential $V_{DAD}$ of the latent images by the electrostatic development field ($V_{DAD}$-$V_{color}$ bias) between the photoreceptor and the development rolls 62, 64. These rolls are biased using a chopped DC bias via power supply 70.

The triboelectric charge on conductive black magnetic brush developer 76 in the second housing is chosen so that the black toner is urged towards the parts of the latent images at the most highly charged potential $V_{CAD}$ by the electrostatic development field ($V_{CAD}$-$V_{black\ bias}$) existing between the photoreceptor and the development rolls 66, 68. These rolls, like the rolls 62, 64, are also biased using a chopped DC bias via power supply 71. By chopped DC (CDC) bias is meant that the housing bias applied to the developer housing is alternated between two potentials, one that represents roughly the normal bias for the DAD developer, and the other that represents a bias that is considerably more negative than the normal bias, the former being identified as $V_{Bias\ Low}$ and the latter as $V_{Bias\ High}$. This alternation of the bias takes place in a periodic fashion at a given frequency, with the period of each cycle divided up between the two bias levels at a duty cycle of from 5–10% (Percent of cycle at $V_{Bias\ High}$) and 90–95% at $V_{Bias\ Low}$. In the case of the CAD image, the amplitude of both $V_{Bias\ Low}$ and $V_{Bias\ High}$ are about the same as for the DAD housing case, but the waveform is inverted in the sense that the the bias on the CAD housing is at $V_{Bias\ High}$ for a duty cycle of 90–95%. Developer bias switching between $V_{Bias\ High}$ and $V_{Bias\ Low}$ is effected automatically via the power supplies 70 and 71.

For further details regarding CDC biasing, reference may be had to U.S. Pat. No. 5,080,988 granted to Germain et al on Jan. 14, 1992 and assigned to same assignee as the instant application.

In contrast, in conventional tri-level imaging as noted above, the CAD and DAD developer housing biases are set at a single value which is offset from the background voltage by approximately −100 volts. During image development, a single developer bias voltage is continuously applied to each of the developer structures. Expressed differently, the bias for each developer structure has a duty cycle of 100%.

Because the composite image developed on the photoreceptor consists of both positive and negative toner, a negative pretransfer dicorotron member 100 at the pretransfer station G is provided to condition the toner for effective transfer to a substrate using positive corona discharge.

Subsequent to image development a sheet of support material 102 (FIG. 3) is moved into contact with the toner image at transfer station J. The sheet of support material is advanced to transfer station J by conventional sheet feeding apparatus comprising a part of the paper handling module 8. Preferably, the sheet feeding apparatus includes a feed roll contacting the uppermost sheet of a stack copy sheets. The feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station J.

Transfer station J includes a transfer dicorotron 104 which sprays positive ions onto the backside of sheet 102. This attracts the negatively charged toner powder images from the belt 10 to sheet 102. A detack dicorotron 106 is also provided for facilitating stripping of the sheets from the belt 10.

After transfer, the sheet continues to move, in the direction of arrow 108, onto a conveyor (not shown) which advances the sheet to fusing station M. Fusing station M includes a fuser assembly, indicated generally by the reference numeral 120, which permanently affixes the transferred powder image to sheet 102. Preferably, fuser assembly 120 comprises a heated fuser roller 122 having an outer coating or layer of silicone rubber and a deformable backup roller 124 comprising an outer layer comprising a copolymer perfluoroalkyl perfluorovinyl ether with tetrafluroethylene (PFA). Sheet 102 passes between fuser roller 122 and backup roller 124 with the toner powder image contacting fuser roller 122. In this manner, the toner powder image is permanently affixed to sheet 102 after it is allowed to cool. After fusing, a chute, not shown, guides the advancing sheets 102 to a catch trays 126 and 128 (FIG. 2), for subsequent removal from the printing machine by the operator.

The heated fuser roll 122 utilizes two lamps 170 and 172. The lamp 170 provides a uniform output of approximately 125 watts per linear inch at 200 volts over its 14 inch length. The lamp 172 provides approximately 125 watts over the outboard 11 inches and only 0 watts over the inboard three inches.

The surface temperature is monitored using two thermistors 174 and 176 mounted approximately 195 angular degrees, counterclockwise from the fusing nip as viewed in FIG. 3. In an arrangement where the fuser roll and pressure roll are positioned in a side by side orientation, the fuser nip is at approximately the three o'clock position and the thermistors are located at approximately the ten o'clock.

The thermistor 174 is positioned adjacent the inboard end 178 of the fuser roll while the thermistor 176 is positioned adjacent the outboard end 180 thereof. The outboard thermistor is utilized for controlling the surface temperature of the heated fuser roll while the inboard thermistor is used for determining which lamp is activated.

When running 14 inch prints a temperature imbalance is not expected across the roll and either thermistor can be used to control the on-time of the 14 inch lamp. When running 11 inch prints, however, it is expected that the last three inches on the inboard end will be colder (higher loss to the pressure roll) and the outboard thermistor must be used to maintain the fuser temperature over the outboard 11 inches (print area). Therefore, the outboard thermistor is used to determine the desired on-time of the fuser lamp and the inboard thermistor is used to determine which lamp is on. If the inboard temperature is below target the 14 inch lamp is turned on. If the inboard temperature is at or above target the 11 inch lamp is turned on.

The voltages from the thermistors are converted to a 0–255 bit scale in machine firmware where a thermistor reading of 0 bits corresponds to 450°±15° F. and a thermistor reading of 255 bits corresponds to 250°±15° F.

Proper control consists of maintaining the fuser at one of three separate temperatures depending on the state of the machine. During runtime, when the fuser roll, pressure roll, and wick are engaged and paper is being fed, the roll temperature is maintained at a runtime target of approximately 183 bits (335° F.). When the machine is in standby the fuser roll, pressure roll, and oil wick are disengaged and the fuser roll temperature is maintained at a target of approximately 220 bits (370° F.). A third state, known as ready, is declared as the fuser temperature approaches standby (i.e., in an initial power up), indicating that the fuser temperature is sufficiently high to allow the printer to commit to a job. Ready is typically about 10 bits below standby. The algorithm used by the microprocessor inverts or flips the bit values resulting in the higher bit value 200 corresponding to a higher temperature than the lower bit value 183.

The thermistor output relating bits to temperature in °F. is highly nonlinear but over the range of targets listed above corresponds to 1 bit≈1° F.

Machine data shows that when the fuser lamp is unplugged and the fuser is operating near 335° F., the temperature drop measured by a non-contact infrared detector when running 14 inch paper is approximately 0.3° F. per print. The Andromeda printer generates 92 prints per minute so the steady state thermal loss to paper is approximately 0.5° F. per second.

With the 125 watt lamp, machine data indicated that the long term 14 inch lamp duty cycle with 14 inch paper and a 0.090 inch silicone coating roll was 65%. Model calculations reported herein are, therefore, based on a 0.5° F. loss per second to paper and a 0.5/0.65=0.77° F. gain per second from the lamp.

In the initial transition from standby to runtime after the pressure roll and oil wick are engaged but prior to paper entering the fusing nip the fuser roll temperature drops about 3.3 bits per second. In the initial transition from runtime to standby after the pressure roll and oil wick are disengaged the fuser roll temperature increases about 3.0 bits for each second of lamp on time.

In accordance with the present invention, each thermistor is calibrated three times., at three different temperatures Measured resistance values are converted to bit values which the machine's microprocessor 6 can relate to temperature. The three values are utilized for constructing a calibration curve for a specific thermistor bead. Use of the curve allows for mathematical interpolation by the microprocessor between points, providing a wider and more accurate range for setting the fuser roll temperatures. This increased accuracy over a wider width than before allows the sensor to become a common part for a family of products which may incorporate different standby and runtime temperature requirements of its sensor.

The thermistor bead calibration procedure followed involves placing the thermistor bead in an oil bath at a predetermined temperature, say 154° C.±0.05° C. The electrical resistance of the bead is measured. The thermistor is then placed in the oil bath with the oil temperature at another predetermined temperature, say 168° C.±0.05° C. The resistance of the thermistor bead is again measured. The thermistor is placed in the oil, bath with the oil temperature at still another predetermined temperature, say 182 degrees C±0.05° C. The resistance of the thermistor bead is again measured. Corresponding bit values are calculated according to the formula for a straight line. According to such a formula, the temperatures 154° C.±0.05° C., 168° C.±0.05° C. and 182 degrees C± 0.05° C. equate to 165, 188 and 210 bits, respectively. For a given setpoint, the thermistor target temperatures are determined by the machine microprocessor using linear approximation.

The implementation involves the setting of eight (i.e. six calibration values one runtime value and one standby value) NVM locations and firmware code and the calculation of values for four other memory locations, the calculated values corresponding to inboard and outboard runtime and standby target values. Thus, the calibration bit values, for both the inboard and outboard thermistors are manually entered into the memory locations using a User Interface Keyboard (UIK) 200. To accomplish the foregoing entry of memory values, a machine diagnostic mode is available by entering the proper code for this purpose using the UIK. This requires inputting of six values, three for the inboard thermistor and three for the outboard thermistor. Additionally, a setpoint temperature for for both runtime and standby are entered in the foregoing manner The runtime and standby setpoints will vary from one product to another.

Target values for runtime and standby for both the inboard and outboard thermistors are calculated in the microprocessor using a linear approximation according to the following algorithm:

For setpoint temperatures > 168° C.

$$\text{Target} = (R182 - R168) \times (\text{Setpoint} - 168)/14 + R168$$

where the target is expressed in bits;

$R182$, and $R168$ are thermistor bead resistances expressed in bits according to calibration values determined as set forth above;

and Setpoint is the desired operating temperature for either runtime or for standby.

For setpoint temperatures ≤ 168° C.

$$\text{Target} = R168 - (R168 - R154) \times (168 - \text{Setpoint})/14$$

where the target is expressed in bits;

$R168$ and $R154$ are thermistor bead resistances expressed in bits according to calibration values determined as set forth above;

and Setpoint is the desired operating temperature for either runtime or for standby.

A total of four (i.e. two for each thermistor) bit values corresponding to four targets are calculated by the microprocessor and stored in preassigned NVM locations. In operation of the fuser at the desired setpoint temperatures, the bit values stored in these four NVM locations are used for controlling the operating temperatures of the fuser roll 122.

After the sheet of support material is separated from photoconductive surface of belt 10, the residual toner particles carried by the non-image areas on the photoconductive surface are removed therefrom. These particles are removed at cleaning station L. A cleaning housing 130 supports therewithin two cleaning brushes 132, 134 supported for counter-rotation with respect to the other and each supported in cleaning relationship with photoreceptor belt 10. Each brush 132, 134 is generally cylindrical in shape, with a long axis arranged generally parallel to photoreceptor belt 10, and transverse to photoreceptor movement direction 16. Brushes 132,134 each have a large number of insulative fibers mounted on base, each base respectively journaled for rotation (driving elements not shown). The brushes are typically detoned using a flicker bar and the toner so removed is transported with air moved by a vacuum source (not shown) through the gap between the housing and photoreceptor belt 10, through the insulative fibers and exhausted through a channel, not shown. A typical brush rotation speed is 1300 rpm, and the brush/photoreceptor interference is usually about 2 mm. Brushes 132, 134 beat against flicker bars (not shown) for the release of toner carried by the brushes and for effecting suitable tribo charging of the brush fibers.

Subsequent to cleaning, a discharge lamp 140 floods the photoconductive surface 10 with light to dissipate any residual negative electrostatic charges remaining prior to the charging thereof for the successive imaging cycles. To this end, a light pipe 142 is provided. Another light pipe 144 serves to illuminate the backside of the P/R downstream of the pretransfer dicorotron 100. The P/R is also subjected to flood illumination from the lamp 140 via a light channel 146.

Figure 4:
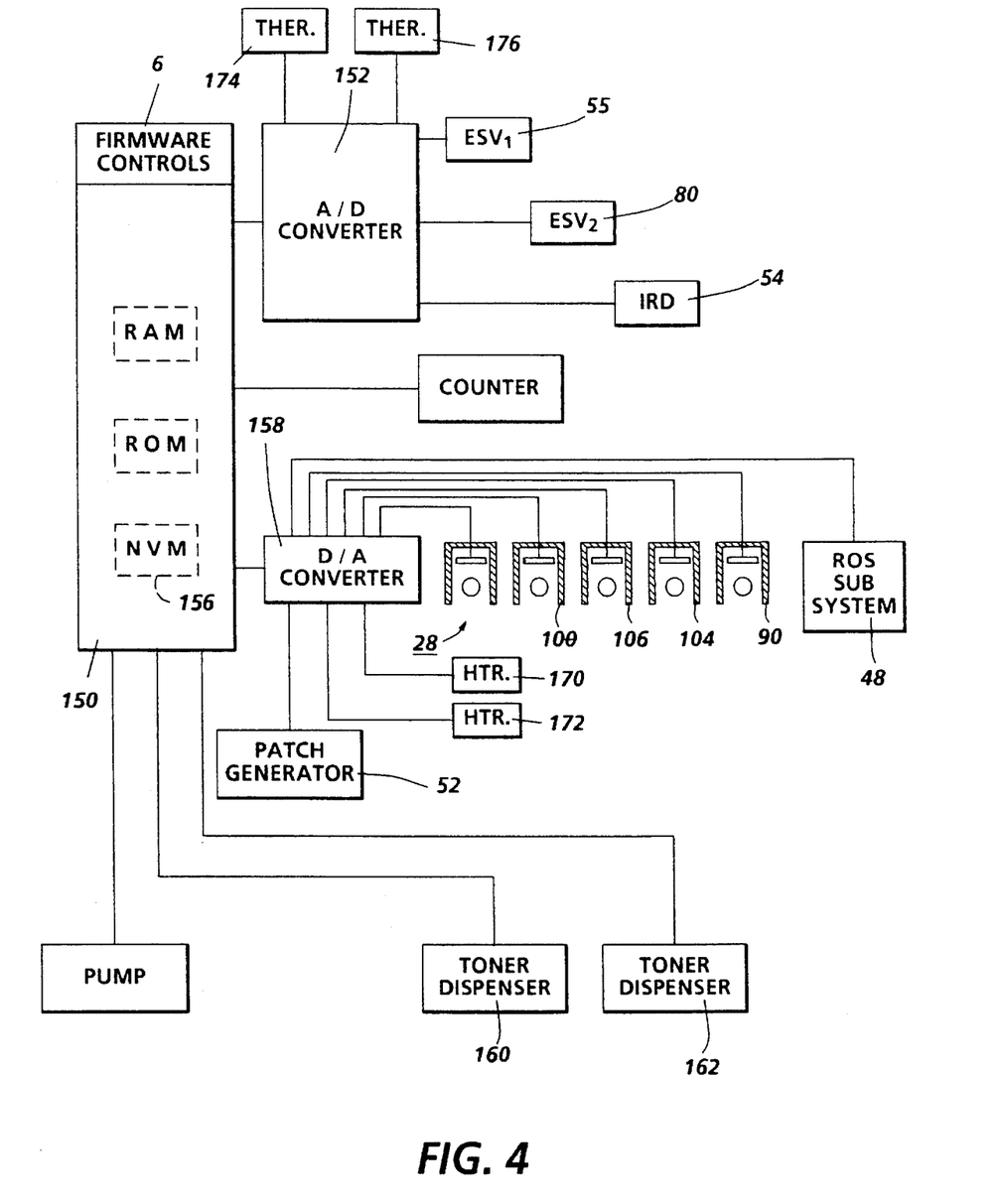
FIG. 4 is a block diagram illustrating the interconnection among active components of the xerographic process module and the control devices utilized to control them.
Figure 5:
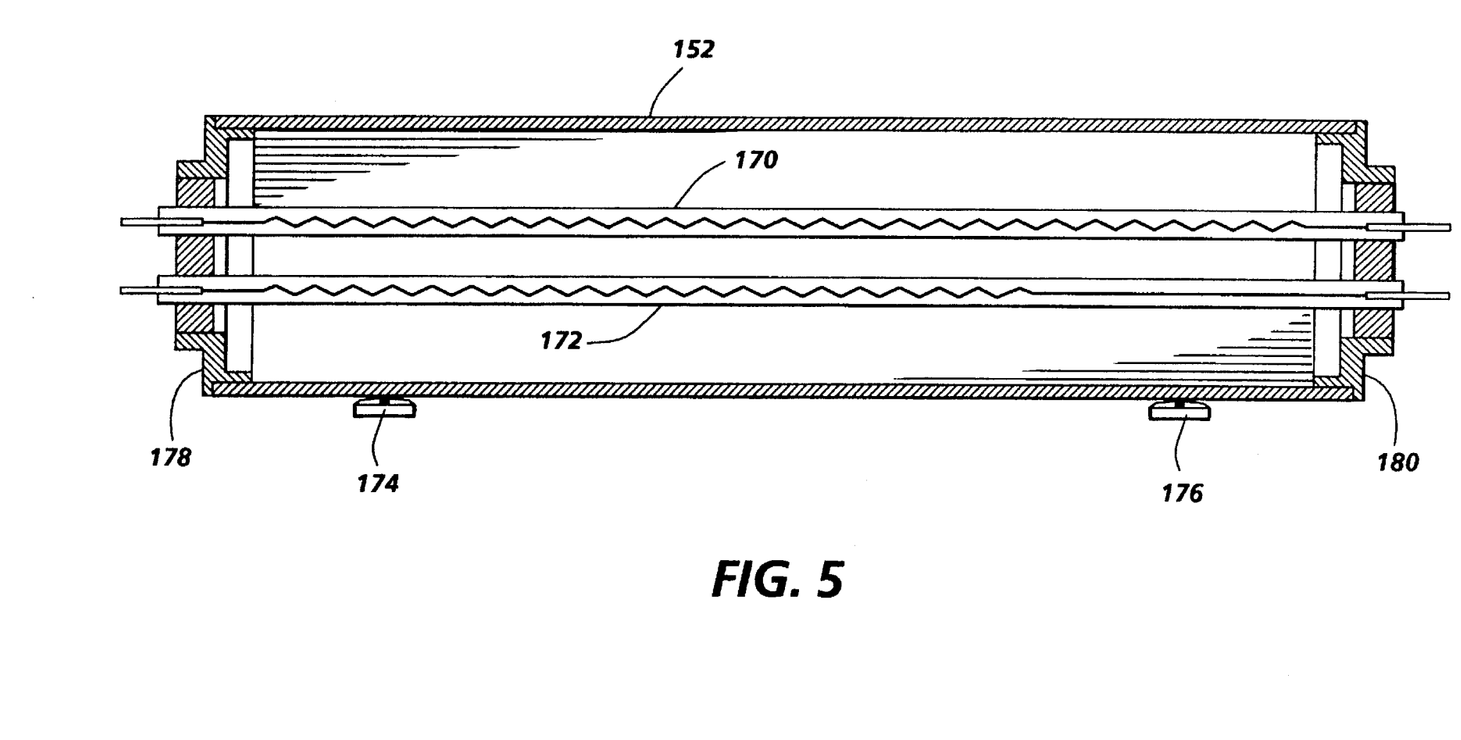
FIG. 5 is schematic view of a fuser roll and a pair of thermistors used for controlling the surface temperature of the fuser roll.

FIG. 4 depicts the the interconnection among active components of the xerographic process module 4 and the sensing or measuring devices utilized to control them. As illustrated therein, $ESV_1$, $ESV_2$ (80) and IRD 54 are operatively connected to a control board 150 through an analog to digital (A/D) converter 152. $ESV_1$ and $ESV_2$ produce analog readings in the range of 0 to 10 volts which are converted by Analog to Digital (A/D) converter 152 to digital values in the range 0–255. Each bit corresponds to 0.040 volts (10/255) which is equivalent to photoreceptor voltages in the range 0–1500 where one bit equals 5.88 volts (1500/255).

The digital value corresponding to the analog measurements are processed in conjunction with a Non-Volatile Memory (NVM) 156 by firmware forming a part of the microprocessor 6. The digital values arrived at are converted by a digital to analog (D/A) converter 158 for use in controlling the ROS 48, dicorotrons 28, 90, 100, 104 and 106. Toner dispensers 160 and 162 are controlled by the digital values. Target values for use in setting and adjusting the operation of the active machine components are stored in NVM.

IRD 54 is used to monitor the toner control patches written in interdocument zones and developed by the developer structures 58 and 60. For low developed mass, reflection IRDs are quite sensitive to the amount of toner present but the amount of developed toner is very sensitive to small changes in patch development field. As the patch developed mass is increased, the sensitivity to voltage variations is reduced but the output of the IRD suffers from a reduced signal-to-noise ratio. The toner patch voltage can vary for many reasons including dirt (i.e. toner) buildup on the patch generator lens, variations in the patch generator exposure LEDs, changes (fatigue, dark decay, etc) in the P/R Photo-Induced Discharge Curve (PIDC). In a tri-level xerographic system the black toner patch voltage is also affected by wrong-sign color background development and voltage loss via conductivity of the color developer brush.

$ESV_1$ and $ESV_2$ monitor the various control patch voltages to allow for feedback control. While the system is constantly adjusting the patch generator exposure to keep the toner patch voltage at its proper target, small errors in the patch voltage are inevitable. This can result in small changes in the patch development field and associated variations in the developed patch mass. This, in turn, can finally lead to shifts in the developer housing toner concentration.

However, this problem is avoided by using the ESV readings to adjust the IRD readings of each toner patch. For the black toner patch $ESV_2$ readings are used to monitor the patch voltage. If the voltage is above target (high development field) the IRD reading is increased by an amount proportional to the voltage error or voltage difference. Conversely, if $V_{tb}$ is below target, the IRD reading is reduced by such an amount.

For the color toner patch $ESV_1$ readings and the dark decay projection to the color housing are used to make a similar correction to the color toner patch IRD readings (but opposite in sign because, for color, a lower voltage results in a higher development field). To this end both $ESV_1$ and $ESV_2$ are used to measure the charge on the color toner patch and an interpolated value is calculated from these measured values according to the following formula:

$$V_{tc}@Color=V_{tc}@ESV_1-0.465\times(V_{Mod}@ESV_1-V_{Mod}@ESV_2)$$

For a better understanding of the derivation of the foregoing interpolation reference may be had to U.S. Pat. No. 5,157,441 granted to Scheuer et al on Oct. 20, 1992.

The calculated target values are utilized to control operation of heater members 170 and 172. To this end digital bit values corresponding to the target values are made available, using suitable circuitry, to the heater members 170 and 172 via the Digital to Analog converter 158 for controlling the voltages applied to the heater members for run and standby operation.

I claim:

1. A method of controlling the surface temperature of a heated fuser member having a heater structure operatively supported internally thereof, said method including the steps of:

supporting a heated fuser member in pressure engagement with a pressure roller for fusing toner images heating said heated fuser member using a heater structure supported internally thereof;

supporting at least one thermistor in temperature sensing relationship with said heated fuser member;

establishing calibration bit values at three different temperatures for said at least one thermistor;

storing said calibration bit values in non-volatile memory storing standby and runtime bit values in non-volatile memory using said bit values and standby and runtime bit values for calculating said runtime and standby target values for said at least one thermistor;

storing said target values in non-volatile memory; and utilizing said target values for controlling the operating characteristics of said heat structure.

2. The method according to claim 1 wherein said steps of storing said calibration but value and storing standby and runtime bit values comprises using a user interface keyboard.

3. The method according to claim 2 wherein said step of calculating comprises using a linear interpolation/extrapolation approximation algorithm.

4. The method according to claim 3 wherein said step of storing said target values non-volatile memory is effected using a microprocessor.

5. The method according to claim 1 including the step of supporting a plurality of thermistors in temperature sensing relationship with said heated fuser member.

6. The method according to claim 5 wherein said heater structure comprises two heater members controlled using said plurality of thermistors.

7. The method according to claim 6 wherein said steps of storing said calibration bit values and storing standby and runtime bit values comprises using a user interface keyboard.

8. The method according to claim 7 wherein said step of calculating comprises using a linear interpolation/extrapolation approximation algorithm.

9. The method according to claim 8 wherein said step of storing said target values in non-volatile memory is effected using a microprocessor.

10. Heat and pressure fuser apparatus comprising:

a fuser roll;

a heating structure disposed internally of said fuser roll for elevating the surface temperature of said fuser roll to a fusing temperature;

a pressure roll cooperating with said fuser roll to form a nip through which copy substrates carrying toner images pass with said toner images contacting said fuser roll, said rolls having inboard and outboard ends;

a thermistor supported in temperature sensing relationship with said heated fuser member;

means for establishing calibration bit values at three different temperatures for said thermistor;

means for storing said calibration bit values in non-volatile memory means for storing standby and runtime bit values in non-volatile memory means stored in memory for calculating runtime and standby target values for each of said thermistors;

means for storing said target values in non-volatile memory; and means for utilizing said target values for controlling the operating characteristics of said heat structure.

11. Apparatus according to claim 10 wherein said means for storing said calibration bit values and storing standby and runtime bit values comprises using a user interface keyboard.

12. Apparatus according to claim 11 wherein said means stored in memory comprises a linear interpolation/extrapolation approximation algorithm.

13. Apparatus according to claim 12 wherein said means for storing said target values in non-volatile memory comprises a microprocessor.

14. Apparatus according to claim 1 including another thermistor supported in temperature sensing relationship with said heated fuser member.

15. Apparatus according to claim 14 wherein said heating structure comprises two heater members controlled using said thermistors.

16. Apparatus according to claim 15 wherein said means for storing said calibration bit values and storing standby and runtime bit values comprises a user interface keyboard.

17. Apparatus according to claim 16 wherein said means stored in memory comprises a linear interpolation/extraporation approximation algorithm.

18. Apparatus according to claim 17 wherein said means for storing said target values in non-volatile memory comprises a microprocessor.

* * * * *